US012580828B2

(12) United States Patent
Khirallah et al.

(10) Patent No.: US 12,580,828 B2
(45) Date of Patent: Mar. 17, 2026

(54) SUPPORTING SLICES ON A CELL LEVEL IN A TELECOMMUNICATION NETWORK

(71) Applicant: Samsung Electronics Co., Ltd., Suwon-si (KR)

(72) Inventors: Chadi Khirallah, Staines (GB); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 18/153,086

(22) Filed: Jan. 11, 2023

(65) Prior Publication Data

US 2023/0224227 A1 Jul. 13, 2023

(30) Foreign Application Priority Data

Jan. 11, 2022 (GB) .................................... 2200273.7
Jan. 9, 2023 (GB) .................................... 2300284.3

(51) Int. Cl.
*H04L 41/40* (2022.01)
*H04W 8/24* (2009.01)

(52) U.S. Cl.
CPC ............... *H04L 41/40* (2022.05); *H04W 8/24* (2013.01)

(58) Field of Classification Search
CPC ...... H04L 41/40; H04L 41/0895; H04W 8/24; H04W 48/18; H04W 8/02; H04W 60/04; H04W 88/14
See application file for complete search history.

(56) References Cited

U.S. PATENT DOCUMENTS

2018/0227873 A1   8/2018   Vrzic et al.
2018/0317163 A1   11/2018   Lee et al.
(Continued)

FOREIGN PATENT DOCUMENTS

WO   2021/021423 A1   2/2021
WO   2021-200234 A1   10/2021
(Continued)

OTHER PUBLICATIONS

3GPP; 3rd Generation Partnership Project; Technical Specification Group Services and System Aspects; System architecture for the 5G System (5GS); Stage 2 (Release 17); 3GPP TS 23.501; V17.3.0; Dec. 23, 2021; Valbonne, France.
(Continued)

*Primary Examiner* — Michael A Keller
*Assistant Examiner* — Thao D Duong
(74) *Attorney, Agent, or Firm* — Jefferson IP Law, LLP

(57) ABSTRACT

The disclosure relates to a 5G or 6G communication system for supporting a higher data transmission rate. A method performed by a user equipment (UE) in communication with a telecommunication network is provided. The method includes transmitting an indication to the telecommunication network, the indication indicating an ability of the UE to support at least one slice on at least one of a per-cell level or a per-tracking area (TA) level. The UE and the telecommunication network support network slicing. Disclosed is a method of operating a User Equipment, UE, in communication with a telecommunication network, wherein the UE and the telecommunication network support network slicing, wherein the UE indicates to the telecommunication network its ability to support at least one slice on either a per-cell level or a per-Tracking Area, TA, level.

16 Claims, 4 Drawing Sheets

TAI 1
Available slices : S-NSSAI A, B [Slice Group 1]

UE'S RA=
TAI 1 + TAI 2

TAI 2
Available slices : S-NSSAI A, B, C [Slice Group 2]

(56)                References Cited

U.S. PATENT DOCUMENTS

| | | | |
|---|---|---|---|
| 2020/0053619 A1* | 2/2020 | Sartori | H04W 8/08 |
| 2020/0205065 A1 | 6/2020 | Wei et al. | |
| 2021/0037426 A1* | 2/2021 | Zhu | H04W 76/12 |
| 2021/0219204 A1 | 7/2021 | Shi et al. | |
| 2021/0392501 A1 | 12/2021 | Buyukdura | |
| 2022/0022165 A1* | 1/2022 | Zhang | H04W 72/51 |
| 2022/0264505 A1 | 8/2022 | Lanev et al. | |
| 2022/0361135 A1* | 11/2022 | Won | H04W 76/11 |
| 2023/0026697 A1 | 1/2023 | Li | |
| 2023/0086365 A1 | 3/2023 | Fu et al. | |
| 2023/0100377 A1* | 3/2023 | Ramappa | H04W 48/16 |
| | | | 726/4 |
| 2024/0196316 A1* | 6/2024 | Hedman | H04W 48/18 |

FOREIGN PATENT DOCUMENTS

| | | |
|---|---|---|
| WO | 2021-203827 A1 | 10/2021 |
| WO | 2021/237623 A1 | 12/2021 |
| WO | 2022/157666 A1 | 7/2022 |
| WO | 2022/175896 A1 | 8/2022 |
| WO | 2023/280580 A1 | 1/2023 |
| WO | 2023/080057 A1 | 5/2023 |
| WO | 2023/106347 A1 | 6/2023 |
| WO | 2023/133150 A2 | 7/2023 |

OTHER PUBLICATIONS

Ericsson; [Post115-e][242][Slicing] Cell—vs. UE specific slice group signalling (Ericsson); 3GPP TSG-RAN WG2 #116-e electronic, Electronic, Nov. 1-12, 2021; R2-2110702; Oct. 25, 2021.

International Search Report with Written Opinion dated Apr. 11, 2023; International Appln. No. PCT/KR2023/000495.

Extended European Search Report dated Mar. 3, 2025, issued in a European Application No. 23740443.9.

United Kingdom Office Action dated Aug. 13, 2024; United Kingdom Appln. No. GB2300284.3.

United Kingdom Office Action dated Jun. 9, 2023; United Kingdom Appln. No. GB2300284.3.

Apple; Handling abnormal case of no "allowed NSSAI" in Registration Accept; 3GPP TSG-CT WG1 Meeting #131-e; C1-214332; E-meeting; Aug. 19-27, 2021.

3GPP; 3rd Generation Partnership Project; Technical Specification Group Core Network and Terminals; Non-Access-Stratum (NAS) protocol for 5G System (5GS); Stage 3; (Release 17); 3GPP TS 24.501; V17.4.1; Sep. 2021; Valbonne, France.

* cited by examiner

FIG. 1

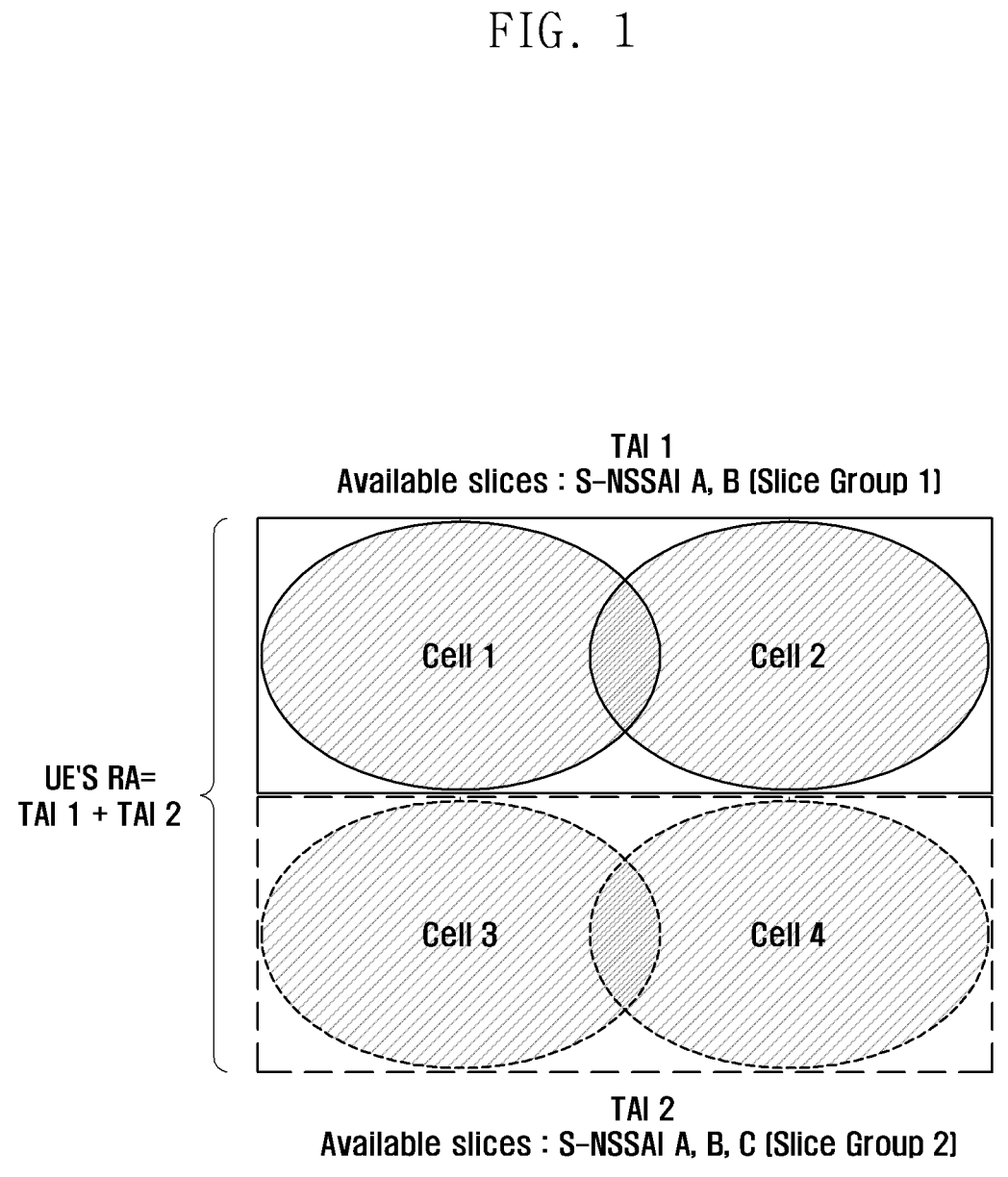

TAI 1
Available slices : S-NSSAI A, B (Slice Group 1)

UE'S RA=
TAI 1 + TAI 2

Cell 1

Cell 2

Cell 3

Cell 4

TAI 2
Available slices : S-NSSAI A, B, C (Slice Group 2)

SUPPORTING SLICES ON A CELL LEVEL IN A TELECOMMUNICATION NETWORK

CROSS-REFERENCE TO RELATED APPLICATION(S)

This application is based on and claims priority under 35 U.S.C. § 119(a) of a United Kingdom patent application number 2200273.7, filed on Jan. 11, 2022, in the United Kingdom Intellectual Property Office, and of a United Kingdom patent application number 2300284.3, filed on Jan. 9, 2023, in the United Kingdom Intellectual Property Office, the disclosure of each of which is incorporated by reference herein in its entirety.

BACKGROUND

1. Field

The disclosure relates to a technique for supporting slices on a cell level in a telecommunication network.

2. Description of Related Art 5G mobile communication technologies define broad frequency bands such that high transmission rates and new services are possible, and can be implemented not only in "Sub 6GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Network slicing is supported in the Fifth Generation System (5GS) (Release 15, Rel-15), where a User Equipment (UE) requests to register for a set of slices by sending a 'requested network slice selection assistance information (NSSAI)' and the network allocates the set of slices that are allowed to be used, where these slices are indicated in the 'allowed NS SAI'. The requested NS SAI or the allowed NS SAI can contain a maximum of 8 slices (i.e., 8 single (S)-NSSAIs)—the definition/encoding of these information elements (IEs) can be found in 3rd Generation Partnership Project (3GPP) TS 24.501 V17.4.1.

When sending the requested NSSAI, the UE can populate it based on the configured NSSAI and/or a previous allowed NSSAI that may be available in the UE. Note that the configured NSSAI can contain up to a maximum of 16 slices.

In the related art, the allowed NSSAI includes S-NSSAIs that the UE is allowed to use in the serving public land mobile network (PLMN) and current registration area (RA) basis, i.e., any allowed NSSAI which is provided to the UE is valid within the current registration area of the UE and, as such, the UE can expect that any S-NSSAI in the allowed NSSAI would be accessible. Moreover, the UE can establish and maintain protocol data unit (PDU) session(s) with any S-NSSAI in the allowed NSSAI. The registration area of the UE is a set of tracking areas (TAs), each of which is identified by a TA identity (TAI), and may include a set of cells that broadcast the same tracking area code (TAC). All cells in a TA support the same set of S-NSSAIs.

Note that after a successful registration with the access and mobility management function (AMF) of the core network of the 5GS, the UE is provided with a registration area (RA), i.e., with a list of TAIs that define the areas where the UE can move within/into without needing to register again. The AMF determines the UE's registration area (RA) in way that Allowed NSSAI slices are available in all TAs of RA.

The concept of network slicing has evolved in Release-16 and Release-17. For example, in Rel-16, the UE may not be able to use a slice, and hence will not get an allowed NSSAI, until a secondary authentication and authorization succeeds for any S-NSSAI that requires this. As such, the allowed NSSAI may only be obtained when this procedure successfully completes.

In another example, a feature was introduced in Rel-17 in which the UE can only be registered to a slice if the maximum number of UEs that are registered for that slice has not reached the maximum number of UEs that can be supported, and so on.

In all the network slicing features defined in the conventional art, a common assumption exists which is that the allowed NSSAI is on a per registration area (RA) basis, and the UE expects to use the slice regardless of the TA in which the UE is in within the RA. However, new use cases have emerged for which a set of slices may not be available across all the TAs of the RA. Some slices may be available in one or more TAs but not in another.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a technique for supporting slices on a cell level in a telecommunication network.

In accordance with an aspect of the disclosure, a method performed by a user equipment (UE) in communication with a telecommunication network is provided. The method includes transmitting an indication to the telecommunication network, the indication indicating an ability of the UE to support at least one slice on at least one of a per-cell level or a per-tracking area (TA) level, wherein the UE and the telecommunication network support network slicing.

In accordance with another aspect of the disclosure, a method performed by a telecommunication network in communication with at least one UE is provided. The method includes transmitting information to the at least one UE, the information informing of one or more slices or one or more associated slice groups that are available in at least one of a cell, a tracking area, or an RA, wherein the UE and the telecommunication network support network slicing.

In accordance with yet another aspect of the disclosure, a UE in communication with a telecommunication network is provided. The UE includes a transceiver, and at least one processor configured to transmit an indication to the telecommunication network, the indication indicating an ability of the UE to support at least one slice on at least one of a per-cell level or a per-TA level, wherein the UE and the telecommunication network support network slicing.

In accordance with still another aspect of the disclosure, a telecommunication network apparatus in communication in communication with at least one UE is provided. The telecommunication network apparatus includes a transceiver, and at least one processor configured to transmit information to the at least one UE, the information informing of one or more slices or one or more associated slice groups that are available in at least one of a cell, a tracking area, or a RA, wherein the UE and the telecommunication network apparatus support network slicing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is an illustration showing a deployment scenario with two slice groups within a registration area (RA) of user equipment (UE) according to various embodiments of the disclosure;

Throughout the drawings, like reference numerals will be understood to refer to like parts, components, and structures.

DETAILED DESCRIPTION

Figure 2:
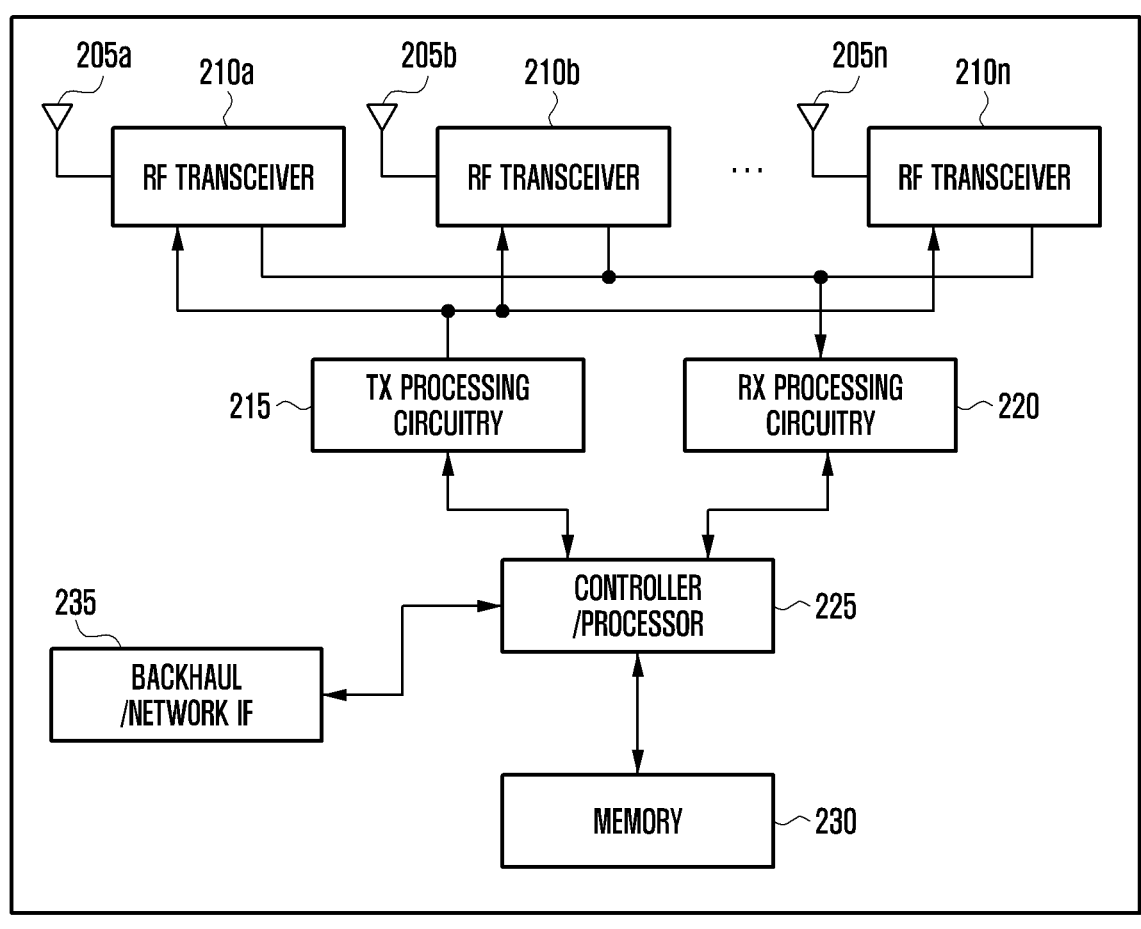
FIG. 2 illustrates an example gNB according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In all the network slicing features defined in the conventional art, a common assumption exists which is that an allowed network slice selection assistance information (NS-SAI) is on a per registration area (RA) basis, and a user equipment (UE) expects to use the slice regardless of the TA in which the UE is in within the RA. However, new use cases have emerged for which a set of slices may not be available across all tracking areas (TAs) of the RA. Some slices may be available in one or more TAs but not in another.

According to a first aspect of the present invention, there is provided a method of operating a User Equipment, UE, in communication with a telecommunication network, wherein the UE and the telecommunication network support network slicing, wherein the UE indicates to the telecommunication network its ability to support at least one slice on either a per-cell level or a per-Tracking Area, TA, level.

In an embodiment, the UE receives information on one or more slices or slice groups from an Access and Mobility Management Function, AMF, in the telecommunication network.

In an embodiment, the UE stores the information received from the AMF.

According to a second aspect of the present invention, there is provided a method of operating a telecommunication network in communication with at least one UE, wherein the UE and the telecommunication network support network slicing, wherein the telecommunication network informs the at least one UE, of one or more slices or one or more associated slice groups which are available in one or more of a cell, a Tracking Area or Registration Area, RA.

In an embodiment, the telecommunication network informs the at least one UE via an Access and Mobility Management Function, AMF.

In an embodiment, the AMF provides priority information to the at least one UE, the priority information being associated with at least one slice group.

In an embodiment, the telecommunication network provides information to the at least one UE indicating one or more slices which belong to a specific slice group.

In an embodiment, the slice group is identified by a Group ID, GID.

In an embodiment, one or more slice is/are only available in one slice group.

According to a third aspect of the present invention, there is provided a UE operable to perform the method of the first aspect.

According to a fourth aspect of the present invention, there is provided a telecommunication network operable to perform the method of the second aspect.

FIG. 1 is an illustration showing a deployment scenario with two slice groups within an RA of a UE according to various embodiments of the disclosure.

Referring to FIG. 1, a slice group may also be defined such that, e.g.:

A slice group 1 is known to contain the slices identified by single (S)-NSSAI A and S-NSSAI B.

A slice group 2 is known to contain slices identified by S-NSSAI C.

In FIG. 1, both Cell 1 and Cell 2 broadcast TAI 1, whereas Cell 3 and Cell 4 broadcast TAI 2. TA1 contains slice group 1 and TA2 contains both slice group 1 and slice group 2. Where slice group 1 contains S-NSSAIs A and B, whereas slice group 2 is composed of S-NSSAI C.

Note that FIG. 1 merely illustrates an example of how slices can be deployed in different TAs of an RA. It may be the case that one cell alone supports a certain slice X, and so on. There may also be one, two or more groups.

The availability of certain slices in specific TAs introduces additional problems and these are explained in more detail in the following.

A particular problem may be experienced when/if a slice is available in one TA but not the other as is described below.

As indicated earlier, a related art UE assumes that all the slices in the allowed NSSAI are available in the entire RA. If this assumption is no longer valid due to new deployment scenarios, such as those set out above, then the UE needs to be informed so that this basic yet important assumption is no longer considered by the UE, and that the UE will have to treat certain slices as allowed/available only within certain TAs of the RA. There are currently no means by which a UE in this scenario can be provided with this indication and, moreover, not all UEs would be capable of processing such new deployments. For example, a Rel-15 UE would not be able to "comprehend" or process a non-homogeneous slice availability within an RA. Therefore, it is an aim of embodiments of the disclosure to provide a method to inform certain UEs about any new deployments while also being able to serve UEs of a previous release in a backwards compatible manner.

Once the network determines which UE(s) can be informed about the new deployment, a subsequent aspect that needs to be addressed is about the actual indication and its contents. In other words, what information is sent to the UE and which information element (IE) should be used to do so must be defined. For example, whether and how to indicate which slice belongs to which group needs to be described and specified.

Moreover, how the UE behaves when it receives the new indication(s) is also not currently defined. This depends on assumptions that can be made regarding the deployments and how such slices can be accessible. For example, how the UE decides to use or request a slice based on the current TA is yet to be defined. Another potential problem is about the status of a protocol data unit (PDU) session that might have been established in a previous TA but now the UE has moved into a new TA where the slice that is associated with that session is not available. Here, a determination should be made as to whether the session be released or kept.

As can be seen, the above are a few examples of certain issues that should be addressed. A standardized set of solutions is desirable so that all the UEs behave in a manner that is consistent with the expected feature.

In a first embodiment, the UE indicates to the network, either via radio resource control (RRC) or non-access stratum (NAS) messages (which may be existing messages or new messages), whether the UE supports slices on a per cell level or per tracking area (TA) level, or whether the UE supports the use/access of slices that are not homogeneously deployed in a given registration area (RA). Note that the name of the indication is just an example and may be different. However this is achieved, the UE indicates to the network that it is capable to process, support, etc., the availability of slices in some areas (e.g., one or more cells, one or more TAs) of the RA. For example, this capability may be defined as a new bit in the 5G mobility management (5GMM) capability IE that the UE sends in a Registration Request message.

Alternatively, the UE provides this indication in any other IE (new or existing) that can be sent in any NAS message. Alternatively, this indication may be sent in the RRC message to the radio access network (RAN). Note that the indication from the UE may be in the form of a bit position (e.g., in an existing IE) or in the form of a new IE.

Upon reception of this new indication by the RAN entity (e.g., base stations, next generation node B (gNB)), the RAN entity may locally save this information in the UE's context and determine whether the UE supports the use/access, etc., of slices within an area (e.g., one or more cells, one or more TAs) of the RA. The RAN entity may further send this indication to the core network (e.g., AMF) using any message e.g., on the N2 protocol interface.

The network, e.g., AMF, may receive an indication that the UE supports the use/access, etc., of slices within some areas (e.g., one or more cells, one or more TAs) of the RA, where this indication may be received in any IE of a NAS message (e.g., in the 5GMM capability IE of the Registration Request message) or this indication may be received from the RAN entity as described above. If the network supports the deployment of slices, or the network supports slices, in different areas (e.g., one or more cells, one or more TAs) of the RA, then the network may indicate to the UE about this support using any IE (e.g., 5GS network feature support IE). The indication may be in the form of a new bit or a new IE altogether. The value of this indication is set such that the network indicates if the slices are available in all the TAs (or cells) of the RA, or only within some areas (e.g., one or more cells, one or more TAs) of the RA. Note that the meaning of the indication may be for different levels of slice support e.g., per cell, more than one cell, a TA, more than one TA, etc.

The UE may receive an indication that slices are not homogeneously deployed in an RA, or that slices are available in certain areas (e.g., one or more cells, one or more TAs) of the RA. The UE may determine that slices are either available in all of the RA or not based on this new indication, e.g., that is received in the 5GS network feature support IE, or based on any other RRC message (which may be dedicated or broadcast). Note that the UE may make the determination about the support of certain slices in certain areas (e.g., one or more cells, one or more TAs) of the RA based on the value received in an IE of the NAS message (e.g., based on a new bit position in the 5GS network feature support IE, or based on a new IE in any NAS message), or based on any RRC message (dedicated or broadcast). The UE may optionally make this determination in combination with at least one other IE that may be received in any NAS message, e.g., based on additionally receiving a new IE indicating which slices are available (e.g., in some TAs), or based on receiving an allowed NSSAI IE and optionally a new IE which indicates which slices are available (e.g., in some TAs).

Note that the operations above can also apply if the indications from the UE and/or the network have other meanings such as "support of slice group per TA", or any combination of new indications of support of new features. As such the examples provided above are not to be limited to the names given to them but can be general to cover the general support of heterogenous slice deployment within an RA, optionally where the slices are known to belong to a group (identified by a group identifier (ID)), and optionally where a slice may or may not be only available in one group.

Note that herein, the term group ID (GID) may refer to a set of slices (e.g., set of S-NSSAIs) that are considered to be part of the group, or may explicitly directly refer to the set of slices themselves. For simplicity, the term GID will be used herein. It should be again noted that this is an example of how slices can be deployed in a heterogeneous manner within an RA and it should not be taken as a limitation, i.e., the use of GID is an example only, but other representations of how slices are deployed within an RA may be possible, and hence the method set out herein also apply for these other potential representations.

In a second embodiment, a technique is deployed to indicate the slices which are supported in an RA/TA.

The following describes the means by which the UE determines which slices are available in the sub-areas of an RA e.g., in certain cells and/or TAs, etc. Note that these methods may be used in combination with the details set out above e.g., these methods may be used for/by a UE that supports access to slices that are deployed in a heterogeneous manner, and/or by a network that supports slices that are deployed in a heterogeneous manner.

Note that the term "that are deployed in a heterogeneous manner" is not to be considered as a restriction but rather as an example of a deployment in which the available slices are not accessible available in all of the RA but rather in some sub-areas of the RA, e.g., on a cell or TA, level within the RA, or it may mean that the slices that are allowed for a UE are not available in the UE's entire RA as is currently the case in the related art.

The network defines a GID which may represent a set of slices (e.g., S-NSSAIs), optionally with information about the availability of the GID either on a per cell level or TA level or RA level. For the sake of simplicity, the example of TA level will be used hereafter however this is to be considered as an example only and not a limitation. As such, unless stated otherwise, the same operations would apply for cell level or RA level. Moreover, TA level may contain more than one TA and, as such, it should be considered as a set of TA (which then also means that it can be a set of cells, etc.).

The network e.g., AMF stores information about each GID, the corresponding set of slices, and the TA(s) where the GID is available.

For a UE that supports heterogeneous slices (as described earlier), the AMF determines whether the use of heterogeneous slices is permitted for the UE e.g., based on local configuration and/or subscription information and/or indication from the UE about the support of the feature.

If the network determines that use of heterogeneous slice is allowed for the UE then:

The network should indicate that heterogeneous slice availability is supported/allowed for the UE, where this may be achieved by providing an indication to the UE as described earlier.

The network should send the detailed information indicating which slices are available in their corresponding TA:

The network may send a new IE indicating any of the following: a GID, the set of slices that correspond to the GID, and optionally the TA(s) where the GID is available. Note that this information may also contain priority information to indicate which priority is associated with a GID, where the priority may be based on predefined level or an explicit priority indication, etc.

The network may also indicate which slice is available in all the TAs or in the UEs RA. This may be achieved by either:

Sending any such slice in the Allowed NSSAI IE (which is the current IE that is used), or Indicating explicitly which GID and/or slices are available in all the TAs, if any.

The network may also inform the RAN about the UE's support of heterogeneous slices, e.g., as part of the UE's context that is provided from the core network (e.g., AMF) to the RAN.

If the network determines that use of heterogeneous slice is NOT allowed for the UE, e.g., either because the subscription and/or local configuration does not permit it, or because the UE does not support heterogeneous slices (e.g., a UE of a previous release, or a UE that simply does not support the feature), then:

The network (e.g., AMF) indicates that heterogeneous slices are not supported (or does not indicate that heterogeneous slices are supported).

The network determines if there is any slice, either from the UE's requested slices or from the slices that are marked as default in the UE's subscription, which is available in the entire RA:

If at least one such slice is available (in the entire RA), then the network provides this slice in the allowed NSSAI if the slice is indeed allowed to be used (e.g., no other condition needs to be verified). For example, if the slice is subject to secondary authentication or authorization, then the slice is sent to the UE as a pending NSSAI instead. However, the main idea is that the network determines if there is any potential slice that can be accessed/allowed for the UE in the entire RA, and if yes, then the network sends it to the UE in the appropriate IE (e.g., Allowed NSSAI IE or Pending NSSAI IE, or both IEs may be sent if needed/possible). In this option, the proposal may be implemented such that the AMF first determines the RA for the UE and based on that verifies which slices are available in the determined RA and then handles the slices as described above. The AMF may be configured to operate in this manner.

If at least one slice is available, but not in the entire RA, then the AMF may determine the RA to be the set of TAs where the slice is available. Then the AMF handles the at least one slice as described in the bullet point above. In this option, the AMF may first determine the slices that are available in some TAs and based on that the AMF determines that these TAs are what composed the RA, and then handles the slices as described in the bullet point above given that the RA is now determined. The AMF may be configured to operate in this manner.

If no slice can be provided to the UE such that at least one slice is available in the entire RA, then the AMF may reject the UE's registration, or deregister the UE, and include the appropriate cause in the NAS message, where the cause may be an existing cause value or a new value.

The UE may send a different/new request for slices, where the request may be a request for a GID. For example, a new requested GID IE may be defined (where this is to be considered as an example of an IE name and not a restriction). The UE may be configured with the GID that can be requested, e.g., either the UE is pre-configured in the mobile equipment (ME), or in the universal subscriber identity module (USIM) (e.g., in an existing elementary file or a new elementary file), or from a previous registration with the network where the UE may have obtained this GID. The GID that is requested by the UE may be based on a priority level, or a default priority level (e.g., for initial registration, where priority may not be known for the case that it can only be known after registration, etc.), or based on user choice/input. The priority level may be configured in the UE using the means stated above for the GID. As such, the GID may also have a corresponding priority level. The UE may request the GID with the highest priority or may request a set of GIDs in a priority order which may be explicit or implicit, e.g., based on the position of the GID in the list of requested GID.

As such, the network may determine to indicate support of heterogeneous slices, e.g., based on this new requested GID IE, and/or based on a new indication from the UE, or any combination. For example, the reception of a new requested GID IE, optionally from a UE, may act as an implicit indication that heterogeneous slices is supported by the UE, however the NAS message may also contain an explicit indication about the support as described earlier.

A UE may receive an indication that the network supports heterogeneous slices, where this indication may be an explicit indication (e.g., in an IE of an RRC/NAS message, or broadcast message) or may be a new IE, e.g., allowed GID IE where this new IE may contain the GID and optionally the set of slices that they contain and optionally the TAs where each GID is available. Note that this may be received in addition to the existing Allowed NSSAI IE (or pending NSSAI IE) which is considered to refer to slices that are available in the entire RA.

When the UE receives the indication as described, the UE determines that the network supports heterogeneous slices. The UE stores the received information accordingly and may use it as described in the following.

In a third embodiment, the UE uses the slice GID.

The UE may have a stored GID (where the contents of the GID is as listed earlier, e.g., a GID is associated with a set of slices, the TA(s) where the GID is available, the priority level of a GID, or any other information, and in any combination), where this information may have been configured in the UE using the means described earlier (e.g., pre-configured, or provided by the network from a previous registration, etc.) or the UE may receive this information in a new IE that is included in any NAS message, e.g., Registration Accept message. The UE should store any such information if received in any NAS message.

The UE may determine that heterogenous slices is supported when the UE either receives an explicit indication about it (e.g., in the 5GS network feature support IE that may be sent in the Registration Accept message) or when the UE receives a new IE with a GID as described earlier.

The UE stores and uses the GID as is described next.

The GID may have a priority information and, as such, the UE may determine to use a GID (or a set of slices optionally corresponding to a GID) with a certain priority, where this priority may be part of the information that is received (optionally from the network, e.g., in any NAS message) or may be based on a configuration in the UE or may be based on user input/preference, or any combination or other method.

The RRC layer in the UE should indicate a GID to the NAS layer optionally in addition to the current TA, where the GID indicates the GID alone or the set of slices associated with it.

As such, the network, e.g., RAN, should broadcast GID information where the GID may be the GID supported in the current cell and/or the GID supported in neighboring cells.

The NAS layer may receive one or more GIDs from the RRC (or lower layers) indicating, e.g., the GID of the current cell and/or the GID of a neighboring cell. Based on this information, the NAS may determine to register to use a certain GID (and hence a certain set of slices) by sending a Registration Request and indicating the GID that the UE wants to use, and optionally indicating the set of slices that correspond to the GID, and optionally indicating a priority level. The UE may do so if the selected GID is supported in the current cell or TA.

Additionally or optionally, the NAS layer may determine to select/use a GID in a neighboring cell based on the GID being of a higher priority than the current GID that is either being used or that is in this cell/TA. The NAS may consequently (re-)select a GID, e.g., based on priority of the GID or user preference or local UE policies or the UE Route Selection Policy, URSP, rules in the UE, etc., and once a GID is selected, the NAS layer indicates the selected/preferred GID (or optionally a list of selected GID in some priority order) to the lower layers (or RRC). The RRC may receive a set of selected GIDs, optionally with a priority order. The RRC may perform cell reselection based on the highest priority GID if it is available. Once a cell is selected based on a GID (as described), the RRC indicates the GID and optionally the TA of the cell.

The NAS may receive an indication from the lower layers (e.g., RRC) about a GID and optionally a TA that is different from the current GID and/or TA, or that maybe the selected GID that the UE has not yet registered to. When this occurs, the NAS may determine that the GID in the current cell/TA is different from the last/previous GID of the previous cell/TA, or may determine that this is a new GID that has not yet been registered to. Based on this determination, the UE sends a Registration Request message and includes the GID (or set of slices that it corresponds to) in order to register to the slices.

FIG. 2 illustrates an example gNB according to various embodiments of the disclosure.

The embodiment of the gNB illustrated in FIG. 2 is for illustration only, and the gNB could have the same or similar configuration. However, gNBs come in a wide variety of configurations, and FIG. 2 does not limit the scope of this disclosure to any particular implementation of a gNB.

As shown in FIG. 2, the gNB includes multiple antennas 205a-205n, multiple RF transceivers 210a-210n, transmit (TX) processing circuitry 215, and receive (RX) processing circuitry 220. The gNB also includes a controller/processor 225, a memory 230, and a backhaul or network interface 235.

The RF transceivers 210a-210n receive, from the antennas 205a-205n, incoming RF signals, such as signals transmitted by UEs in the network. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB by the controller/processor 225.

The controller/processor 225 is also capable of executing programs and other processes resident in the memory 230, such as an OS. The controller/processor 325 can move data into or out of the memory 230 as required by an executing process.

The controller/processor 225 is also coupled to the backhaul or network interface 235. The backhaul or network interface 235 allows the gNB to communicate with other devices or systems over a backhaul connection or over a network. The interface 235 could support communications over any suitable wired or wireless connection(s). For example, when the gNB is implemented as part of a cellular communication system (such as one supporting 5G/NR, LTE, or LTE-A), the interface 235 could allow the gNB to communicate with other gNBs over a wired or wireless backhaul connection (e.g., a wireless network link including a non-terrestrial node). When the gNB is implemented as an access point, the interface 235 could allow the gNB to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB, various changes may be made to FIG. 2. For example, the gNB could include any number of each component shown in FIG. 2. As a particular example, an access point could include a number of interfaces 235, and the controller/processor 225 could support measurement of TAI updates in an NTN. For example, the gNB may be or may receive network access via a non-terrestrial node such as a satellite. As another particular example, while shown as including a single instance of TX processing circuitry 215 and a single instance of RX processing circuitry 220, the gNB could include multiple instances of each (such as one per RF transceiver). Also, various components in FIG. 2 could be combined, further subdivided, or omitted and additional components could be added according to particular needs.

Figure 3:
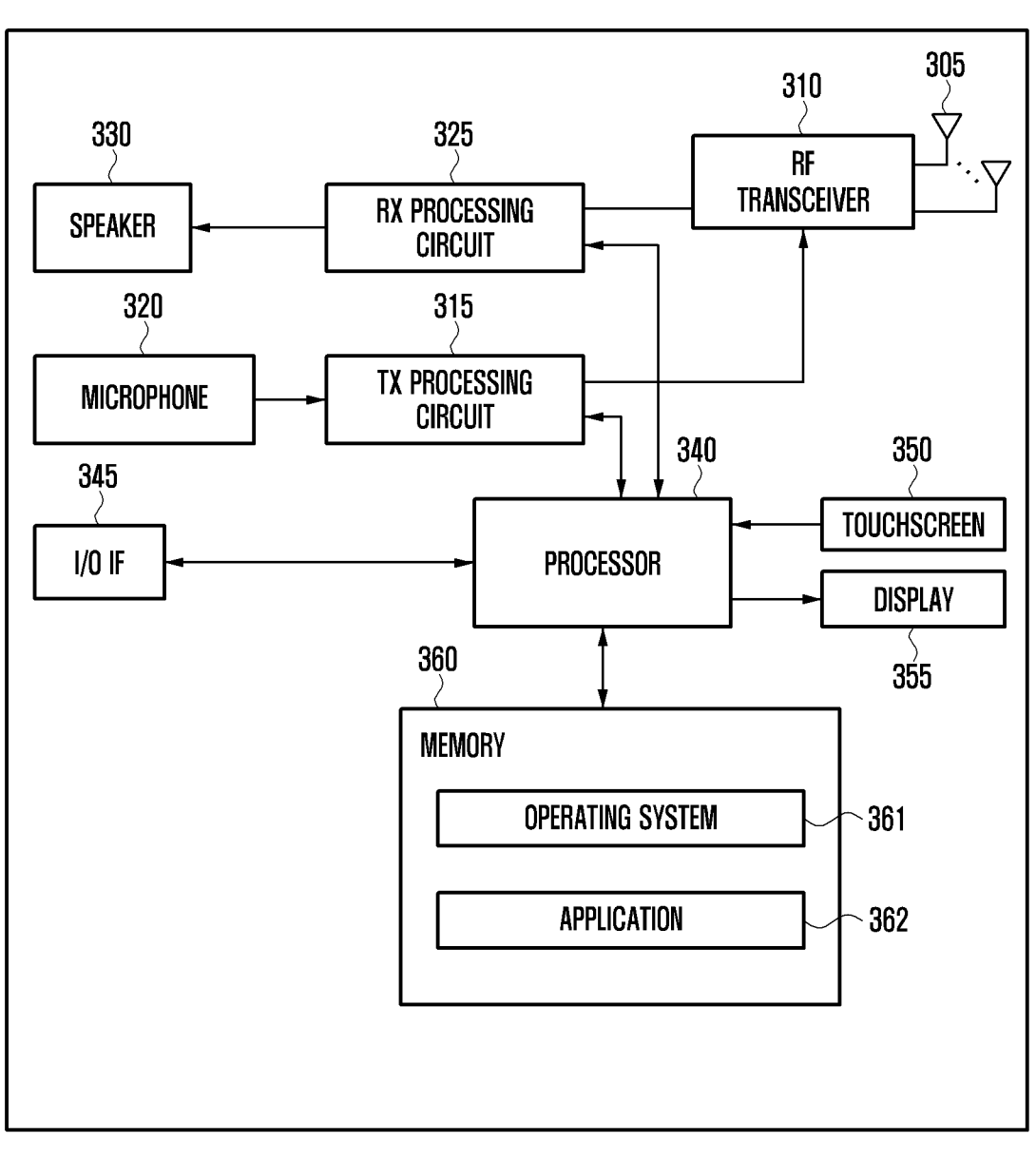
FIG. 3 illustrates an example UE according to various embodiments of the disclosure.

FIG. 3 illustrates an example UE according to various embodiments of the disclosure. The embodiment of the UE illustrated in FIG. 3 is for illustration only, and the UE could have the same or similar configuration. However, UEs come in a wide variety of configurations, and FIG. 3 does not limit the scope of this disclosure to any particular implementation of a UE.

As shown in FIG. 3, the UE includes an antenna 305, a radio frequency (RF) transceiver 310, TX processing circuitry 315, a microphone 320, and receive (RX) processing circuitry 325. The UE also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for measurement of TAI updates in an NTN. For example, in various embodiments, the UE may communicate directly or indirectly with a non-terrestrial node such as a satellite. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 445, which provides the UE with the ability to connect to other devices, such as laptop computers and handheld computers. The I/O interface 345 is the communication path between these accessories and the processor 340.

The processor 340 is also coupled to the touchscreen 350 and the display 355. The operator of the UE can use the touchscreen 350 to enter data into the UE. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
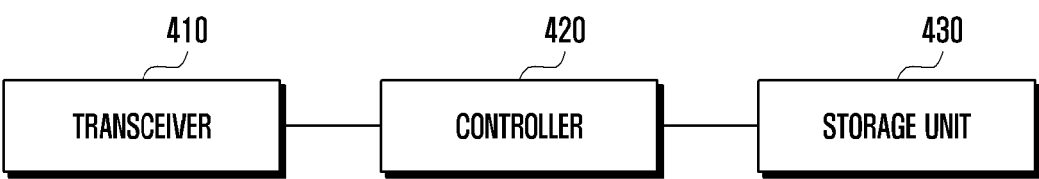
FIG. 4 illustrates an example of a network entity according to various embodiments of the disclosure.

FIG. 4 illustrates an example of a network entity according to various embodiments of the disclosure.

The network entity may correspond to the AMF node in the respective embodiments. Referring to FIG. 4, the network entity may include a transceiver 410, a controller 420, and a storage unit 430. The controller 420 may be defined as a circuit, an application-specific integrated circuit, or at least one processor. The transceiver 410 may transmit/receive signals to/from other network entities. The controller 420 may control overall operations of the UE. The storage unit 430 may store at least one piece of information transmitted/received through the transceiver 410 and information produced through the controller 420.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the operations of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:

transmitting, to an access and mobility management function (AMF), a registration request message including a 5G mobility management (5GMM) core network capability information including information indicating that the UE supports a network slice group related to tracking areas: and receiving, from the AMF, a registration accept message including network slice group information, wherein the network slice group information includes tracking area (TA) information associated with a validity of the network slice group and priority information of the network slice group; and storing the received network slice group information.

2. The method of claim 1, further comprising:

performing a cell reselection based on the received network slice group information.

3. The method of claim 1, wherein the network slice group information further includes at least one single-network slice selection assistance information (S-NSSAI) corresponding to the network slice group.

4. The method of claim 1, wherein the network slice group information further includes an identifier of the network slice group.

5. A method performed by an access and mobility management function (AMF) in a communication system, the method comprising:

receiving, from a user equipment (UE), a registration request message including a 5G mobility management (5GMM) core network capability information including information indicating that the UE supports a network slice group related to tracking areas; and as a response to the registration request message, transmitting, to the UE, a registration accept message including network slice group information, wherein the network slice group information includes tracking area (TA) information associated with a validity of the network slice group and priority information of the network slice group.

6. The method of claim 5, wherein the network slice group information is for a cell reselection.

7. The method of claim 5, wherein the network slice group information further includes at least one single-network slice selection assistance information, S-NSSAI, corresponding to the network slice group.

8. The method of claim 5, wherein the network slice group information further includes an identifier of the network slice group.

9. A user equipment (UE) in a communication system, the UE comprising:

a transceiver; and a controller coupled with the transceiver, and configured to:

transmit, to an access and mobility management function (AMF), a registration request message including a 5G mobility management (5GMM) core network capability information including information indicating that the UE supports a network slice group related to tracking areas, and receive, from the AMF, a registration accept message including network slice group information, wherein the network slice group information includes tracking area (TA) information associated with a validity of the network slice group and priority information of the network slice group, and store the received network slice group information.

10. The UE of claim 9, wherein the controller is further configured to:

perform a cell reselection based on the received network slice group information.

11. The UE of claim 9, wherein the network slice group information further includes at least one single-network slice selection assistance information (S-NSSAI) corresponding to the network slice group.

12. The UE of claim 9, wherein the network slice group information further includes an identifier of the network slice group.

13. An access and mobility management function (AMF) in a communication system, the AMF comprising:

a transceiver; and a controller coupled with the transceiver, and configured to:

receive, from a user equipment (UE) a registration request message including a 5G mobility management (5GMM) core network capability information including information indicating that the UE supports a network slice group related to tracking areas, and as a response to the registration request message, transmit, to the UE, a registration accept message including network slice group information, wherein the network slice group information includes tracking area (TA) information associated with a validity of the network slice group and priority information of the network slice group.

14. The AMF of claim 13, wherein the network slice group information is for a cell reselection.

15. The AMF of claim 13, wherein the network slice group information further includes at least one single-network slice selection assistance information, S-NSSAI, corresponding to the network slice group.

16. The AMF of claim 13, wherein the network slice group information further includes an identifier of the network slice group.

* * * * *